O. RECHNITZ.
CARRIER FOR PLASTER WORK.
APPLICATION FILED MAR. 22, 1910.

1,078,464.

Patented Nov. 11, 1913.

Witnesses:

Inventor:
Otto Rechnitz
by
his Attorney

UNITED STATES PATENT OFFICE.

OTTO RECHNITZ, OF COTTBUS, GERMANY.

CARRIER FOR PLASTER-WORK.

1,078,464.     Specification of Letters Patent.     Patented Nov. 11, 1913.

Application filed March 22, 1910. Serial No. 550,946.

*To all whom it may concern:*

Be it known that I, OTTO RECHNITZ, merchant, a subject of the German Emperor, and a resident of Cottbus, Germany, have invented certain new and useful Improvements in Carriers for Plaster-Work, of which the following is a specification.

My invention relates to an improved form of composite flexible lathing for supporting the plaster used on walls, ceilings, pillars and the like, and for manufacturing curved surfaces and fireproof partitions.

The invention consists essentially of a plurality of completed bodies made of a material to which the plaster will readily adhere, these bodies being provided with suitable grooves or notches in which the strands of a wire network engage, thus forming a flexible sheet or body which may be rolled, folded, stretched or generally manipulated without danger of the insert bodies being broken or working loose from the wire network or mesh.

The preferred embodiment of the invention is illustratively exemplified in the accompanying drawing, wherein—

Figure 1:
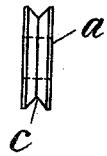
Figure 2:
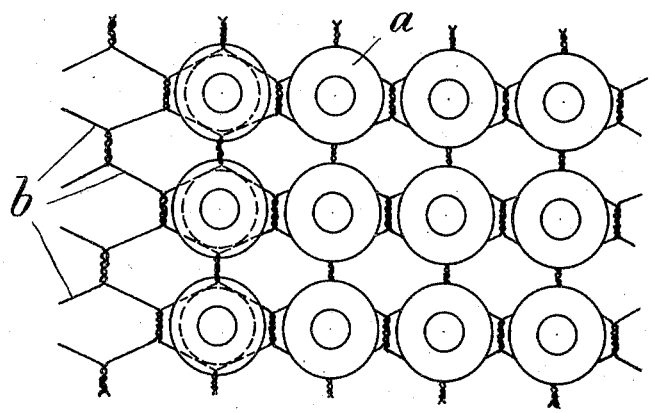

Figure 1 is a side elevational view of one of the insert bodies of clay or mortar; and Fig. 2 is a plan view of a section of the composite lathing as constructed according to my invention.

In the drawing, $a$ designates the bodies of clay or mortar preferably centrally perforated and provided with fairly deep lateral grooves or notches $c$ wherein the strands of a wire network or mesh $b$ engage.

Composite lathing has heretofore been produced by rolling clay or crossed wires and then burning in a kiln, but the present invention differs from this expedient in that I provide finished bodies of clay or mortar, of any desired shape and size, having suitable notches or recesses into which the wires are inserted, clamped, or woven during the manufacture of the wire network.

The advantages over the existing art presented by my invention are the following:—
The insert bodies of clay or mortar, which are preferably perforated, may be supplied ready for use and may be rapidly and securely connected with the wire network and the latter need not be exposed to fire as is the case when the clay and network are placed in a kiln, nor need it be exposed to the moisture requisite for binding the clay bodies when the latter are placed in undried or uncomplete condition on the network. My composite lathing, being highly flexible, may be rolled up and stretched as desired without danger of cracking the insert bodies or of their working loose. It will of course be obvious that any weight of wire, within practical limits, may be employed to give the desired degree of stiffness to the lathing.

By reference to Figs. 2 and 3, it will be seen that the plaster will enter the transverse opening $d$ in insert body $a$, thereby facilitating a more effective bond of the plaster to the lathing by reason of the multitude of such insert bodies and openings therein.

The wires of the mesh $b$ do not embrace the peripheries of the insert bodies by engaging the same, throughout their circumference, and therefore open spaces $a'$ are provided between the inserts, and these spaces permit the plaster to enter between the flanges $c'$ of adjacent inserts, to form block portions $d'$ of the plaster. Centrally of the block portions $d'$ the winds $b'$ of the wires $b$, project in a vertical direction so as to support the block portion $d'$, during and after hardening of plaster. The inclined portion $b^2$ assists the vertical portion $b'$, in supporting the intermediate plaster block portion $d$. It will thus be seen that the intermediate block portions $d'$, are at least equal in thickness to the thickness of the insert and that the plaster, lying in the planes of the inserts $a$, will engage the free peripheries thereof, at point $x$, and also those portions of the peripheries at $x'$, against which the wires of the net engage. However, the openings in the net are greatly in excess of the greatest cross section of the insert bodies and it will be seen that the points at which the wires of the net engage the peripheries of the insert bodies, are readily widely spaced apart, and that the points of engagement are extremely minute in length, thereby leaving the greater portion of the peripheries of the inserts for direct engagement and filling up of plaster therein. The portions of the wires $d'$ and $d^2$, bridge or extend across the spaces between the insert bodies so as to support those portions of the plaster lying in the planes of the bodies and extending therebetween.

Having thus described my invention, what

I claim as new and desire to secure by Letters Patent is:—

1. A composite lathing comprising a plurality of hardened and completed mortar carrying insert bodies of earthen material provided with undercut portions, and a net work having mesh openings exceeding in size the greatest cross sections of said bodies from the undercut portion to the other, the portions of the net work forming the mesh openings engaging relative minute points of the undercut portions of said bodies, leaving the remaining undercut portions free.

2. A composite lathing comprising a plurality of hardened and completed mortar carrying insert bodies made of earthenware material and of circular formation, the peripheral portions of said bodies being undercut, and a net work having mesh openings of polygonal form, the portions of the net work forming said mesh openings engaging the undercut parts of said body at relatively minute parts.

Signed at Berlin this fifth day of March 1910.

OTTO RECHNITZ.

Witnesses:
 WOLDEMAR HAUPT,
 HENRY HASPER.

Copies of this patent may be obtained for five cents each, by addressing the "Commissioner of Patents, Washington, D. C."